(12) United States Patent
Tsai et al.

(10) Patent No.: US 8,947,618 B2
(45) Date of Patent: Feb. 3, 2015

(54) BLUE PHASE LIQUID CRYSTAL DISPLAY DEVICE

(75) Inventors: Cheng-Yeh Tsai, Hsin-Chu (TW);
Tai-Hsiang Huang, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 26 days.

(21) Appl. No.: 13/430,834

(22) Filed: Mar. 27, 2012

(65) Prior Publication Data

US 2013/0083271 A1 Apr. 4, 2013

(30) Foreign Application Priority Data

Oct. 4, 2011 (TW) .............................. 100135896 A

(51) Int. Cl.
*G02F 1/1335* (2006.01)
*G02F 1/137* (2006.01)
(52) U.S. Cl.
CPC .................... *G02F 1/133603* (2013.01); *G02F 2001/133624* (2013.01); *G02F 2001/13793* (2013.01)
USPC .................................. 349/69; 349/61; 349/62
(58) Field of Classification Search
CPC ................................................... G02F 1/1336
USPC .......................................................... 349/69
See application file for complete search history.

(56) References Cited

U.S. PATENT DOCUMENTS

| 7,576,829 | B2* | 8/2009 | Kikuchi et al. ............... 349/175 |
| 2008/0167482 | A1 | 7/2008 | Farrand et al. |
| 2009/0046221 | A1* | 2/2009 | Miyachi ......................... 349/69 |
| 2009/0115957 | A1 | 5/2009 | Coles et al. |
| 2010/0103337 | A1 | 4/2010 | Takaku |
| 2010/0141859 | A1* | 6/2010 | Park et al. ....................... 349/39 |
| 2010/0165255 | A1* | 7/2010 | Ishitani et al. .................. 349/69 |
| 2010/0258763 | A1 | 10/2010 | Schott et al. |
| 2010/0296029 | A1 | 11/2010 | Yasuhiro |
| 2010/0315585 | A1* | 12/2010 | Chien et al. .................... 349/201 |
| 2011/0069245 | A1 | 3/2011 | Haseba et al. |
| 2011/0069263 | A1* | 3/2011 | Takeda .......................... 349/122 |
| 2011/0075073 | A1 | 3/2011 | Oiwa et al. |
| 2011/0075074 | A1 | 3/2011 | Gauza et al. |

FOREIGN PATENT DOCUMENTS

CN 101794040 8/2010

* cited by examiner

*Primary Examiner* — Michael Caley
*Assistant Examiner* — Edmond Lau
(74) *Attorney, Agent, or Firm* — WPAT, PC; Justin King

(57) ABSTRACT

A blue phase liquid crystal display device includes a backlight module and a blue phase liquid crystal display panel. The backlight module includes a plurality of light sources. The light sources generate a plurality of primary color lights with different bands. The blue phase liquid crystal display panel includes a blue phase liquid crystal layer. The blue phase liquid crystal layer includes a plurality of blue phase liquid crystal molecules and a plurality of chiral dopants. The blue phase liquid crystal layer has a reflection band. The reflection band is located between the bands of two adjacent primary color lights.

26 Claims, 11 Drawing Sheets

BLUE PHASE LIQUID CRYSTAL DISPLAY DEVICE

RELATED APPLICATIONS

This application claims priority to Taiwan Patent Application Serial Number 100135896, filed Oct. 4, 2011, which is herein incorporated by reference.

BACKGROUND

1. Technical Field

The present disclosure relates to a display. More particularly, the present disclosure relates to a blue phase liquid crystal display.

2. Description of Related Art

In recent years, for improving the display quality of a liquid crystal display (LCD), blue phase liquid crystals with rapid response are gradually valued, in which the blue phase represents a liquid crystal phase between the isotropic phase and the cholesteric phase and only exists in a narrow temperature range of about 1° C.

The blue phase mainly has three different types, which are the first blue phase (BP I), the second blue phase (BP II) and the third blue phase (BP III), in which liquid crystals of the first blue phase and the second blue phase are in a cubic form, and liquid crystals of the third blue phase are in an amorphous form and exist in a temperature higher than those of the other two types of blue phase.

FIG. 1a and FIG. 1b are schematic diagrams showing a lattice structure and disclination lines of the first blue phase liquid crystal respectively. FIG. 1c and FIG. 1d are schematic diagrams showing a lattice structure and disclination lines of the second blue phase liquid crystal respectively. As shown in FIG. 1a and FIG. 1c, a basic unit of the lattice structure of each of the first and second blue phase liquid crystals is a double twist cylinder (DTC) 100; that is, the double twist cylinders therein are arranged perpendicular with each other. Moreover, the first blue phase liquid crystal has a body-centered cubic (BCC) structure, and the second blue phase liquid crystal has a simple cubic (SC) structure. The disclination lines 102 of the first blue phase liquid crystal and the second blue phase liquid crystal are shown in FIG. 1b and FIG. 1d. Different from nematic liquid crystals, smectic liquid crystals and isotropic liquid crystals, the first blue phase liquid crystals and the second blue phase liquid crystals are shown as platelet texture patterns when being viewed under a polarizing microscope.

On the other hand, the positive blue phase liquid crystal generally uses a lateral electric field induced by electrodes to change its refractive index, thereby enabling the blue phase liquid crystal to generate the change of the bright/dark state after light passing therethrough. The positive blue phase liquid crystals are isotropic in an ideal state and the refractive index change (i.e. Δn) thereof is 0 (zero) in the condition without a lateral electric field from the electrodes. In addition, the positive blue phase liquid crystals in the ideal state are normally black, which herein means that light cannot pass the blue phase liquid crystals when no voltage is applied thereto. Conversely, when the lateral electric field is applied to the positive blue phase liquid crystals, the positive blue phase liquid crystals are anisotropic and the refractive index thereof is changed (i.e. Δn>0), such that the light can pass through the blue phase liquid crystals and the bright state can be shown.

Recently, the blue phase liquid crystal layer mainly consists of components including blue phase liquid crystal molecules and chiral dopants. The chiral dopant can be used for inducing blue phase liquid crystal molecules to form aforesaid double twist cylinders.

Based on the material characteristics of the blue phase liquid crystals, the lattice period of the blue phase liquid crystals follows a function of the wavelength, and accordingly, a selective Bragg reflection would occur base on an incident light with different wavelengthes. In other words, the blue phase liquid crystal molecules have a specific reflective band due to the material characteristics. The reflective band of undoped blue phase liquid crystal molecules fall in the visible light spectral range. However, the undoped blue phase liquid crystal molecules encounter a light leakage problem from the reflective band in a dark state.

In order to reduce the light leakage problem and increase the contrast ratio, chiral dopants of high concentration are usually added to the blue phase liquid crystal layer currently used in a conventional blue phase liquid crystal display device. FIG. 2 is a schematic diagram illustrating a relationship between reflective luminance and wavelength of the reflective light form the positive blue phase liquid crystal layer when the chiral dopants of high concentration are added to the blue phase liquid crystal layer. As shown in FIG. 2, the reflective band 102 of the conventional blue phase liquid crystal layer is usually in an ultraviolet light range 106 located outside the visible light range 104 after the chiral dopants is added at a high concentration.

The conventional blue phase liquid crystal layer can shift the reflective band 102 of the blue phase liquid crystal layer into the ultraviolet light range 106 by adding the chiral dopants at high concentration to reduce the light leakage problem. However, adding chiral dopants at higher concentration will result in the increase of the operating voltage required by the blue phase liquid crystal layer. This induces a difficulty in operating the blue phase liquid crystal layer.

SUMMARY

In order to solve aforementioned problems, the disclosure provides a blue phase liquid crystal display device. In an embodiment, the blue phase liquid crystal layer may utilize chiral dopants of low concentration to reduce the operating voltage of the blue phase liquid crystal panel. In this case, the reflective band of the blue phase liquid crystal layer falls in the visible light range. In the meantime, the backlight module of the blue phase liquid crystal display device utilizes multiple light sources to generate multiple lights with different primary colors respectively having different primary color bands, instead of utilizing a backlight having a full-visible light band (e.g., white light). In addition, the reflective band of the blue phase liquid crystal layer is adjusted to be located between two of the primary color bands. Therefore, the blue phase liquid crystal display device may be operated under low operating voltages and remain high contrast ratios without a light leakage problem.

An aspect of the invention is to provide a blue phase liquid crystal display device which includes a backlight module and a blue phase liquid crystal display panel. The backlight module includes a first light source and a second light source. The first light source and the second light source generate a first primary color light and a second primary color light respectively within a visible light range. The first primary color light has a first primary color band. The second primary color light has a second primary color band. The blue phase liquid crystal display panel includes a blue phase liquid crystal layer. The blue phase liquid crystal layer includes a plurality of blue phase liquid crystal molecules and a plurality of chiral dopants. The blue phase liquid crystal layer has a reflective band between the first primary color band and the second primary color band.

According to an embodiment of the invention, each of the first light source and the second light source comprises a light-emitting diode or an organic light-emitting diode.

According to an embodiment of the invention, the first primary color light and the second primary color light are a blue light and a yellow light respectively.

According to an embodiment of the invention, the blue phase liquid crystal layer comprises a polymer-stabilized blue phase liquid crystal layer. In the embodiment, the polymer-stabilized blue phase liquid crystal layer further comprises a stabilization polymer.

According to an embodiment of the invention, the blue phase liquid crystal molecules comprise positive blue phase liquid crystal molecules. In the embodiment, the blue phase liquid crystal display panel further comprises an in-plane switching display unit array used for controlling the positive blue phase liquid crystal molecules.

According to an embodiment of the invention, the reflective band is located within a visible light range.

According to an embodiment of the invention, the reflective band is corresponding to a doping concentration of the chiral dopants.

According to an embodiment of the invention, a doping concentration of the chiral dopants is in a range of about 3% to 10% in weight percentage of the blue phase liquid crystal layer.

According to an embodiment of the invention, a peak wavelength of the reflective band is substantially located between peak wavelengths of the first primary color band and the second primary color band.

According to an embodiment of the invention, a range of full width at half-maximum of the reflective band is located between ranges of full width at half-maximum of the first primary color band and the second primary color band.

According to an embodiment of the invention, the backlight module further comprises a third light source generating a third primary color light. The third primary color light has a third primary color band. In the embodiment, the third light source comprises a light-emitting diode or an organic light-emitting diode.

According to an embodiment of the invention, the first primary color light and the second primary color light are a blue light and a green light respectively, and the third primary color light is a red light. In the embodiment, a peak wavelength of the reflective band is substantially 475 nanometers.

According to an embodiment of the invention, the first primary color light and the second primary color light are a green light and a red light respectively, and the third primary color light is a blue light. In the embodiment, a peak wavelength of the reflective band is substantially 580 nanometers.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiments, with reference to the accompanying drawings as follows.

DESCRIPTION OF THE EMBODIMENTS

In the following description, several specific details are presented to provide a thorough understanding of the embodiments of the present invention. One skilled in the relevant art will recognize, however, that the present invention can be practiced without one or more of the specific details, or in combination with or with other components, etc. In other instances, well-known implementations or operations are not shown or described in detail to avoid obscuring aspects of various embodiments of the present invention.

Figure 1A:
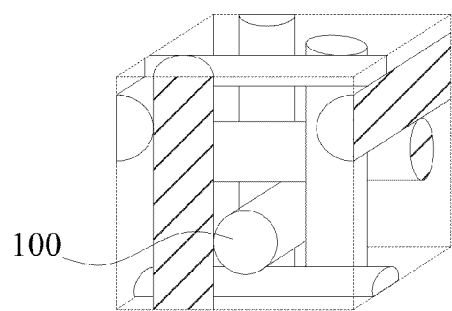
FIG. 1a and FIG. 1b are diagrams showing a lattice structure and disclination lines of the first blue phase liquid crystals respectively.
Figure 1C:
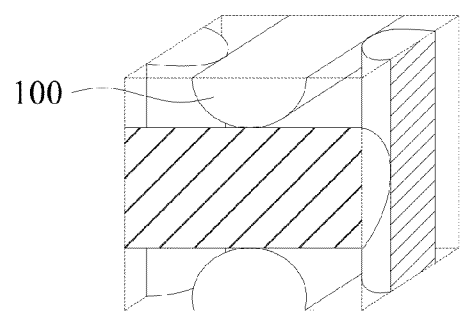
FIG. 1c and FIG. 1d are diagrams showing a lattice structure and disclination lines of the second blue phase liquid crystals respectively.
Figure 1B:
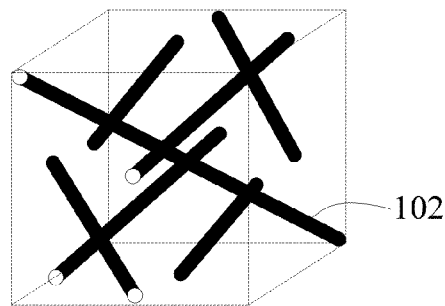
Figure 1D:
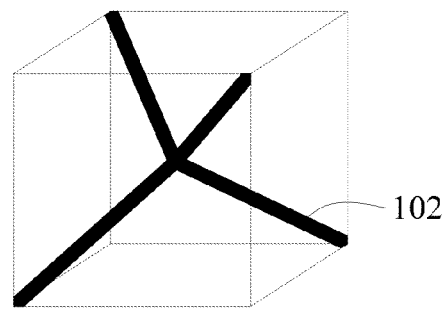
Figure 2:
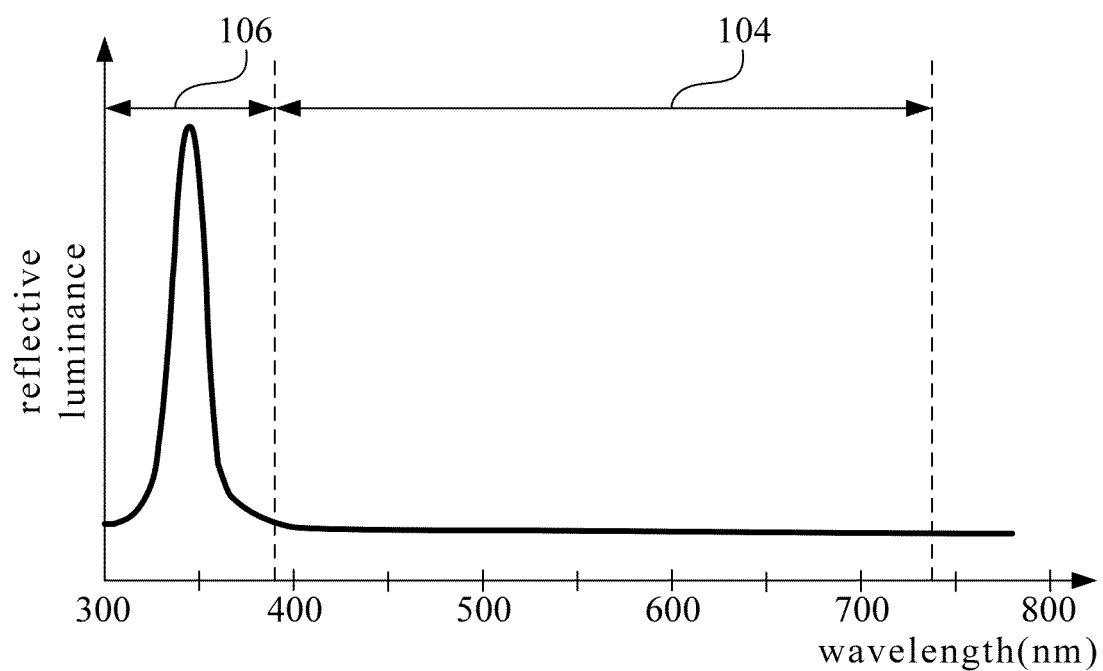
FIG. 2 is a schematic diagram of reflective luminance versus wavelength for the positive blue phase liquid crystals when being driven by electrodes.
Figure 3:
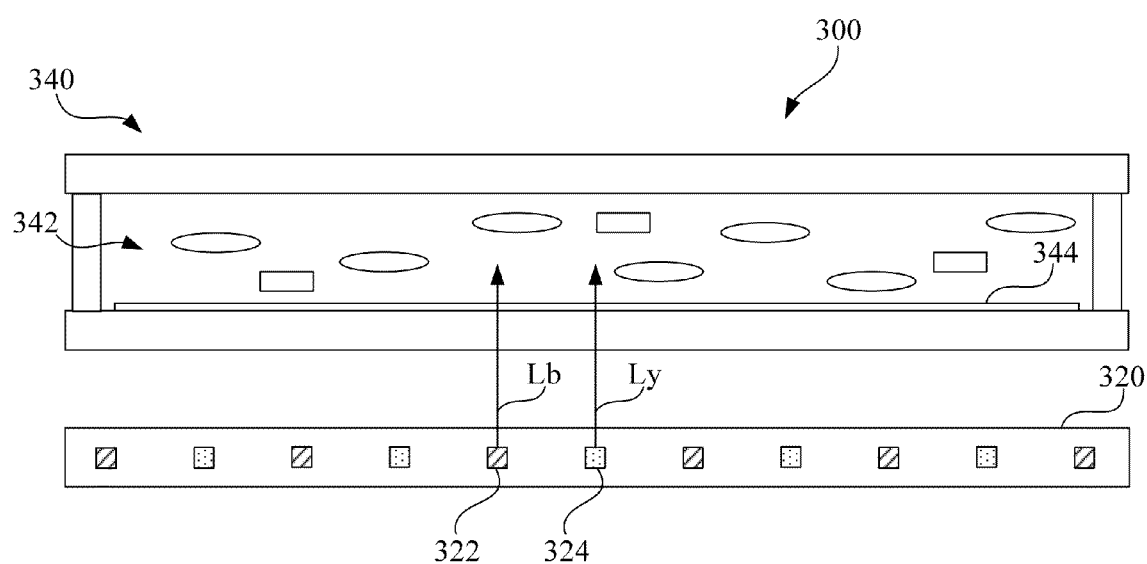
FIG. 3 is a schematic diagram illustrating a blue phase liquid crystal display (LCD) device according to an embodiment of the invention.

Reference is made to FIG. 3, which is a schematic diagram illustrating the blue phase liquid crystal display (LCD) device 300 according to an embodiment of the invention. In the embodiment, the blue phase LCD device 300 includes a backlight module 320 and a blue phase liquid crystal display (LCD) panel 340. Instead of utilizing a backlight having a full-visible light band (e.g., white light), the backlight module 320 utilizes multiple light sources to generating multiple lights with different primary colors respectively having different primary color bands. In addition, a reflective band of the blue phase LCD panel 340 is adjusted to be located between two of the primary color bands. Therefore, the blue phase LCD device 300 can be operated under low operating voltages and remain high contrast ratios without the light leakage problem. The details of the blue phase LCD device 300 are explained in the following paragraphs.

As shown in FIG. 3, the backlight module 320 includes two light sources (i.e., a light source 322 and a light source 324) with different wavelengths. The light source 322 can be used for generating a primary color light Lb, and the light source 324 can be used for generating a primary color light Ly. In the embodiment, the light source 322 can be a light-emitting diode (LED) or an organic light-emitting diode (OLED) having a blue color, so as to generate the primary color light Lb in blue color. On the other hand, the light source 324 can be a light-emitting diode (LED) or an organic light-emitting diode (OLED) having a yellow color, so as to generate the primary color light Ly in yellow color. However, the invention is not limited to the blue light and the yellow light for mixing a full-color light, and in another embodiment, a set of lights with other two primary colors can be applied. The light source 322 and the light source 324 may also be instead by white light sources integrated with different color filters. The backlight module 320 adopting light-emitting diodes (LED) as the light sources can be a direct type backlight module or a side-edge backlight module, but the invention is not limited thereto.

The blue phase LCD panel 340 includes a blue phase liquid crystal layer 342. The blue phase liquid crystal layer 342 includes a plurality of blue phase liquid crystal molecules and a plurality of chiral dopants. Based on the material characteristics of the blue phase liquid crystals, the lattice period of the blue phase liquid crystals follows a function of the wavelength of an incident light, and accordingly, a selective Bragg reflection would occur base on the incident light with different wavelengthes. In other words, the blue phase liquid crystal molecules of the blue phase liquid crystal layer 342 have a specific reflective band.

Figure 4:
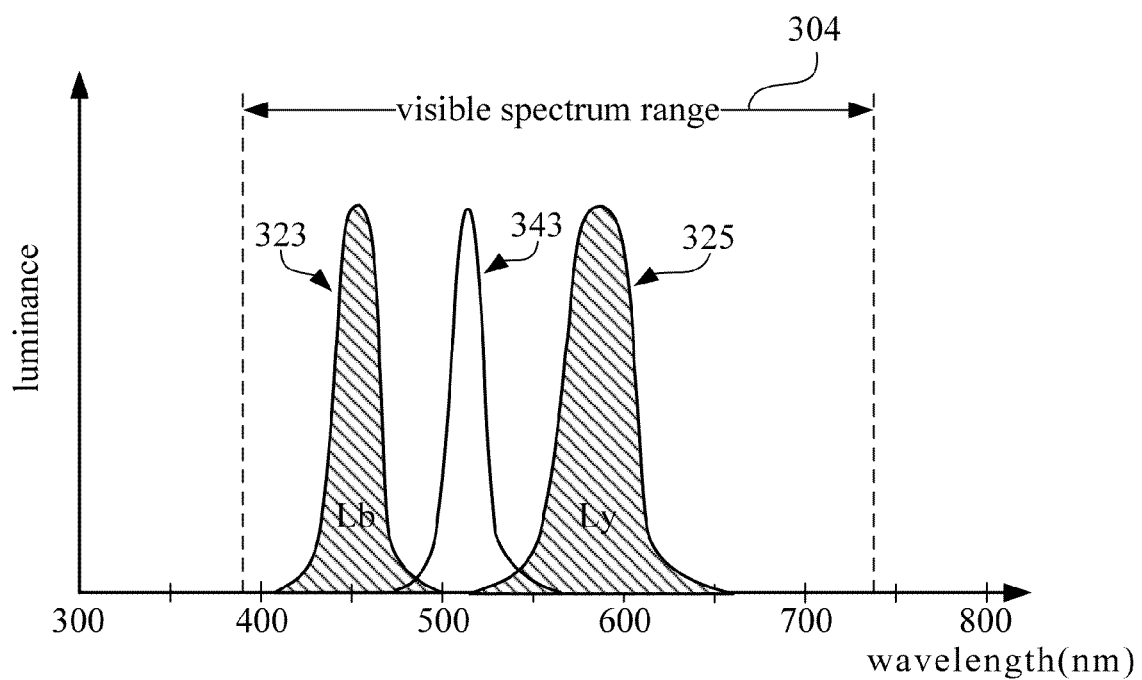
FIG. 4 is a schematic diagram illustrating a reflective band of a blue phase liquid crystal layer shown in FIG. 3.

Reference is made to FIG. 3 and FIG. 4 at the same time. FIG. 4 is a schematic diagram illustrating a reflective band 343 of the blue phase liquid crystal layer 342 shown in FIG. 3.

As shown in FIG. 4, the blue primary color light Lb generated by the light source 322 has a primary color band 323. The yellow primary color light Ly generated by the light source 324 has another primary color band 325.

Figure 5:
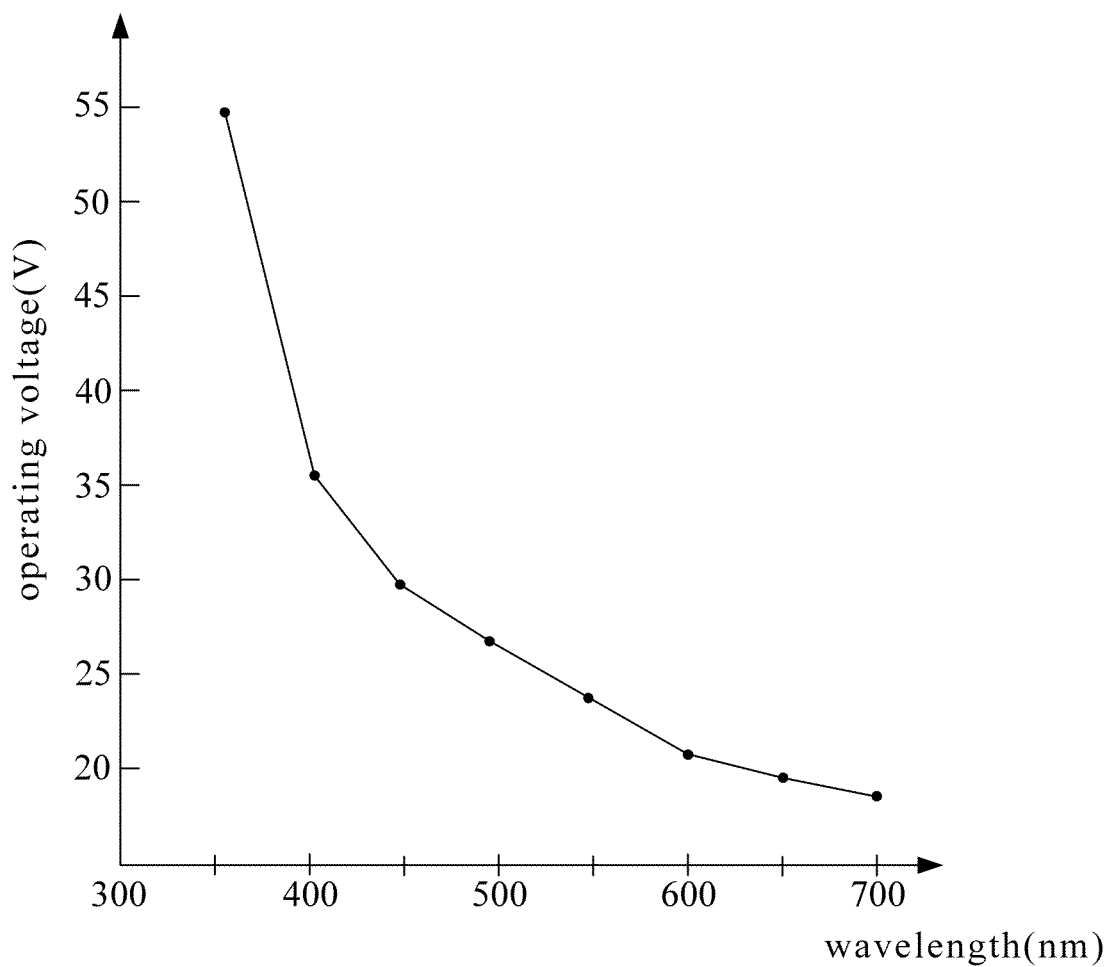
FIG. 5 is a schematic diagram illustrating a relationship between a operating voltage and a peak wavelength of the reflective band of the blue phase liquid crystal layer under different concentrations of the chiral dopants according to the invention.

Reference is made to FIG. 5, which is a schematic diagram illustrating a relationship between the operating voltage and the peak wavelength of the reflective band of the blue phase liquid crystal layer under different concentrations of the chiral dopants according to the present invention.

As shown in FIG. 5, the operating voltage is too high for practical applications in the ultraviolet light range when the operating voltage of the blue phase LCD panel 340 is required about 55 volts in order to shift the peak wavelength of the reflective band outside the visible light range (visible spectrum range from 380 nm to 740 nm). The operating voltage can be cut down by reducing the concentration of the chiral dopants. However, reducing the concentration of the chiral dopants will make the reflective band fall within the visible light range, and it may cause problems including light leakage and reduction of contrast ratio.

The reflective band 343 of the blue phase liquid crystal layer 342 is corresponding to a doping concentration of the chiral dopants in the blue phase liquid crystal layer 342. In the embodiment, the reflective band 343 of the blue phase liquid crystal layer 342 can be adjusted to be located between the blue primary color band 323 and the yellow primary color band 325 by adjusting the doping concentration of the chiral dopants. In a practical example, the doping concentration of the chiral dopants can be from 3% to 10% in weight percentage of the blue phase liquid crystal layer 342 for forming the reflective band 343 in FIG. 4 of the embodiment.

In the case, even though the reflective band 343 of the blue phase liquid crystal layer 342 falls in the visible light range 304, the reflective band 343 are located between two primary color bands 323 and 325 generated by the backlight module 320, such that the light leakage under the dark state can be prevented and the blue phase LCD device 300 can be operated with a high contrast ratio.

Figure 6:
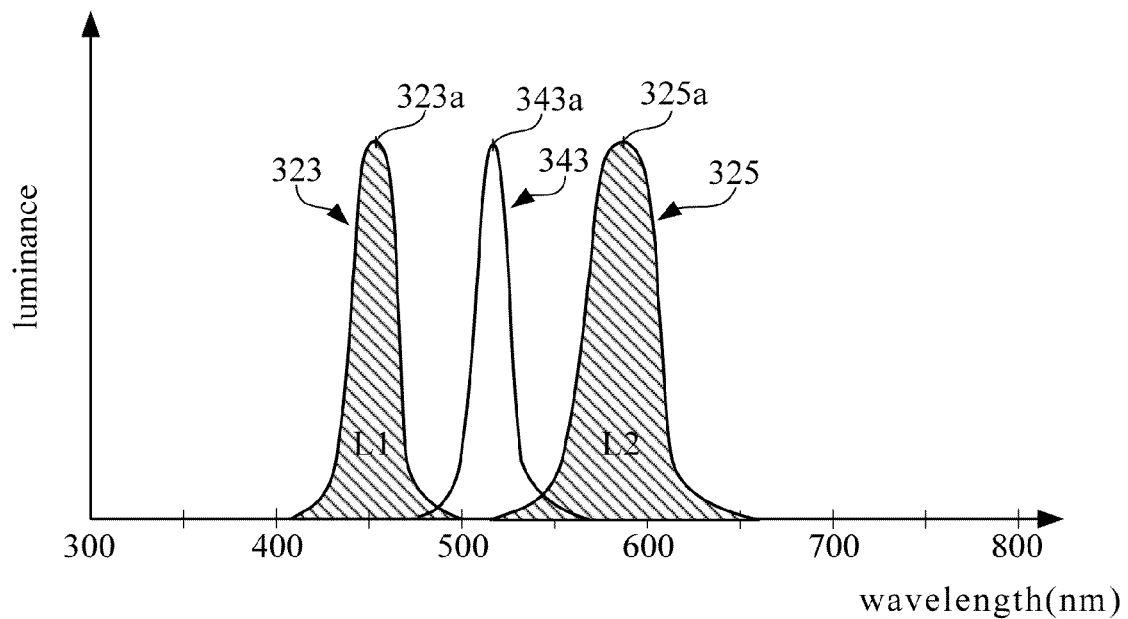
FIG. 6 and FIG. 7 are schematic diagrams illustrating a reflective band, a primary band and another primary band according to an embodiment of the invention.
Figure 7:
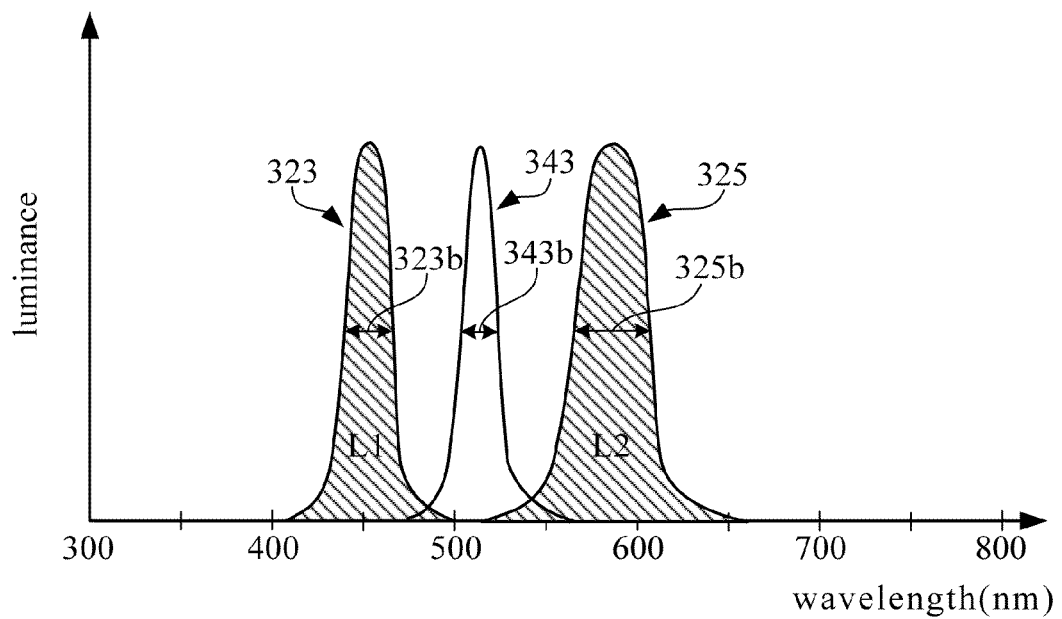

Reference is made to FIG. 6 and FIG. 7 for further explaining about the reflective band 343 between the primary band 323 and the primary band 325. FIG. 6 and FIG. 7 are schematic diagrams illustrating the reflective band 343, the primary band 323 and the primary band 325.

In an embodiment, the definition about the reflective band 343 between the primary band 323 and the primary band 325 can be referred to FIG. 6. As shown in FIG. 6, the peak wavelength 343*a* of the reflective band 343 can be located between the peak wavelength 323*a* of the primary band 323 and the peak wavelength 325*a* of the primary band 325.

In another embodiment, the definition about the reflective band 343 between the primary band 323 and the primary band 325 can be referred to FIG. 7. As shown in FIG. 7, a full width at half-maximum (FWHM) range 343*b* of the reflective band 343 is located between the FWHM range 323*b* of the primary color band 323 and the FWHM range 325*b* of the primary color band 325. In addition, the FWHM range 343*b* of the reflective band 343 is not overlapped either with the FWHM range 323*b* of the primary color band 323 or with the FWHM range 325*b* of the primary color band 325.

The blue phase LCD device 300 in the embodiment of the invention can be operated at a lower operating voltage due to the blue phase liquid crystal layer 342 in the embodiment has a lower doping concentration, in comparison of the conventional blue phase liquid crystal layer operated at a high operating voltage by adding the chiral dopants at high concentration, in order to shift the reflective band of the blue phase liquid crystal layer into the ultraviolet light range, which is located outside the visible light range.

In a practical application, the blue phase liquid crystal layer 342 may include some other substances except the aforementioned blue phase liquid crystal molecules and chiral dopants, for refining optical behaviors or material behaviors. For example, in some embodiments, the blue phase liquid crystal layer 342 may further include a stabilization polymer, e.g., a polymer that is polymerized from monomers or photo-initiators. In the embodiment, the blue phase liquid crystal layer 342 can be a polymer-stabilized blue phase liquid crystal layer. The polymer stabilization process is known by those in the art, and thus is not further described herein.

In addition, the blue phase liquid crystal molecules of the blue phase liquid crystal layer 342 preferably can be positive blue phase liquid crystal molecules. The blue phase LCD panel 340 may further include an in-plane switching (IPS) display unit array 344. The in-plane switching (IPS) display unit array 344 can be used for controlling the positive blue phase liquid crystal molecules. In another embodiment, the blue phase liquid crystal molecules of the blue phase liquid crystal layer 342 also can be negative blue phase liquid crystal molecules, which can be controlled by a vertical alignment (VA) display unit array for achieving similar effects. The driving technologies are well known by those in the art, and thus are not further described herein.

In summary, the blue phase LCD device 300 can be operated at a low operating voltage with a high contrast ratio. In aforementioned embodiment, the backlight module 320 of the blue phase LCD device 300 includes two light sources (the light source 322 and the light source 324), but the invention is not limited thereto.

Figure 8:
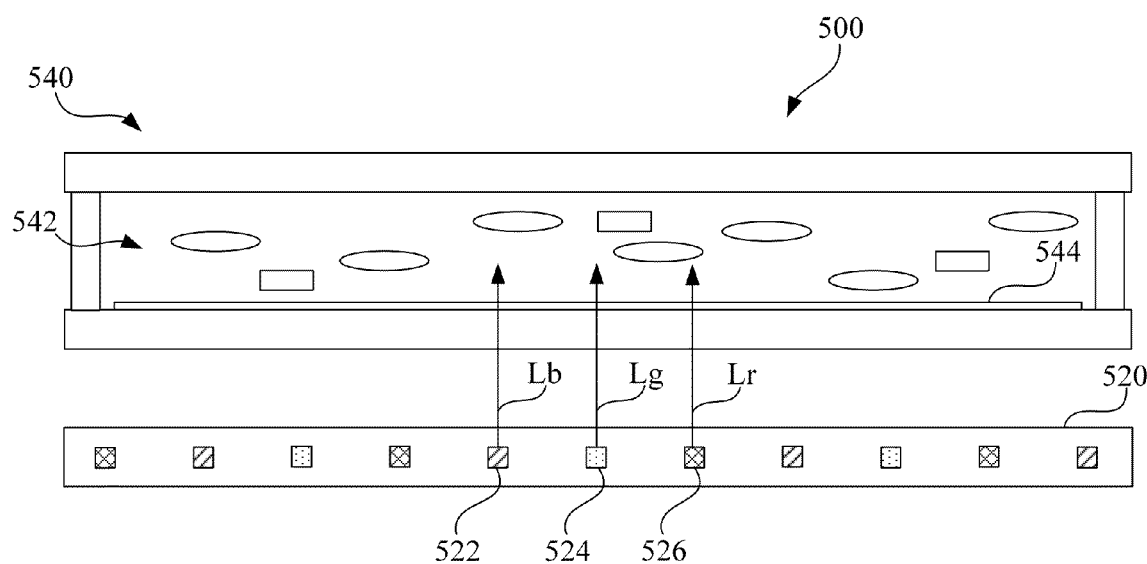
FIG. 8 is a structural diagram illustrating a blue phase LCD device according to another embodiment of the invention.
Figure 9:
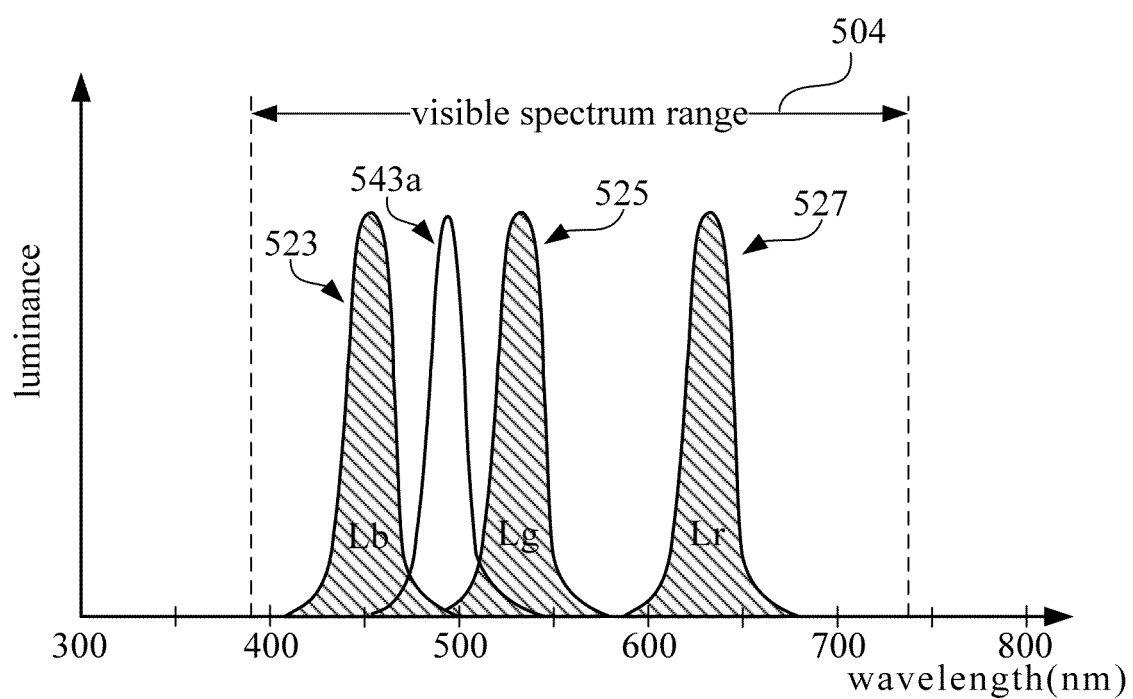
FIG. 9 is a schematic diagram illustrating a reflective band of a blue phase liquid crystal layer shown in FIG. 8.

Reference is made to FIG. 8 and FIG. 9. FIG. 8 is a structural diagram illustrating a blue phase LCD device 500 according to another embodiment of the invention. As shown in FIG. 8, the blue phase LCD device 500 includes a backlight module 520 and a blue phase LCD panel 540. In the embodiment, the backlight module 520 of the blue phase LCD device 500 includes three light sources, such as a light first source 522, a second light source 524 and a third light source 526. FIG. 9 is a schematic diagram illustrating a reflective band 543a of a blue phase liquid crystal layer 542 shown in FIG. 8.

In one embodiment, the light source 522 can be used for generating a primary color light Lb in blue color. The light source 524 can be used for generating a primary color light Lg in green color. The light source 526 can be used for generating a primary color light Lr in red color. In the embodiment, each of the light source 522, the light source 524 and the light source 526 can be a light-emitting diode (LED) or an organic light-emitting diode (OLED). However, the invention is not limited to the blue, green and red lights. In some other embodiments, a set of lights with three, four or six different colors can be applied. For example, cyan, yellow and/or magenta colors can be added thereto.

As shown in FIG. 9, the blue primary color light Lb generated by the light source 522 has a primary color band 523. The green primary color light Lg generated by the light source 524 has a primary color band 525. The red primary color light Lr generated by the light source 526 has a primary color band 527.

The blue phase LCD panel 540 includes a blue phase liquid crystal layer 542. The blue phase liquid crystal layer 542 includes a plurality of blue phase liquid crystal molecules and a plurality of chiral dopants. As shown in FIG. 9, the blue phase liquid crystal layer 542 have a reflective band 543a. In the embodiment, the reflective band 543a is located between the between the primary color band 523 of the blue primary color light Lb and the primary color band 525 of the green primary color light Lg. In this embodiment, the blue primary color light Lb and the green primary color light Lg are the first and the second primary color lights, and the red primary color light Lr is the third primary color light.

In an embodiment, locating the reflective band 543a between two primary bands 523 and 525 can be referred to that the peak wavelength 543a of the reflective band 543 is substantially located between the peak wavelength of the primary band 523 and the peak wavelength of the primary band 525. In practical applications, the peak wavelength 543a of the reflective band 543 can be about 475 nanometers. In another embodiment, locating the reflective band 543a between two primary bands 523 and 525 can be referred to that a full width at half-maximum (FWHM) range of the reflective band 543 is located between the FWHM range of the primary color band 523 and the FWHM range of the primary color band 525. In addition, the FWHM range of the reflective band 543a is preferably not overlapped either with the FWHM range of the primary color band 523 or with the FWHM range of the primary color band 525 for preventing light leakage. Detail definition of the peak wavelengths and the FWHM range can be referred to FIG. 6, FIG. 7 and the corresponding paragraphs, and thus are not to be repeated herein.

The reflective band 543a of the blue phase liquid crystal layer 542 is corresponding to a doping concentration of the chiral dopants. In the embodiment, the reflective band 543a of the blue phase liquid crystal layer 542 can be adjusted to be located between the blue primary color band 523 and the green primary color band 525 by adjusting the doping concentration of the chiral dopants. In a practical example, the doping concentration of the chiral dopants can be 3% to 10% in weight percentage of the blue phase liquid crystal layer 542 for forming the reflective band 543a in FIG. 9 of the embodiment.

In this case, even though the reflective band 543a of the blue phase liquid crystal layer 542 falls in the visible light range 504, the reflective band 543a is located between two primary color bands 523 and 525 generated by the backlight module 520, such that the light leakage under the dark state can be prevented and the blue phase LCD device 500 can be operated with a high contrast ratio.

Figure 10:
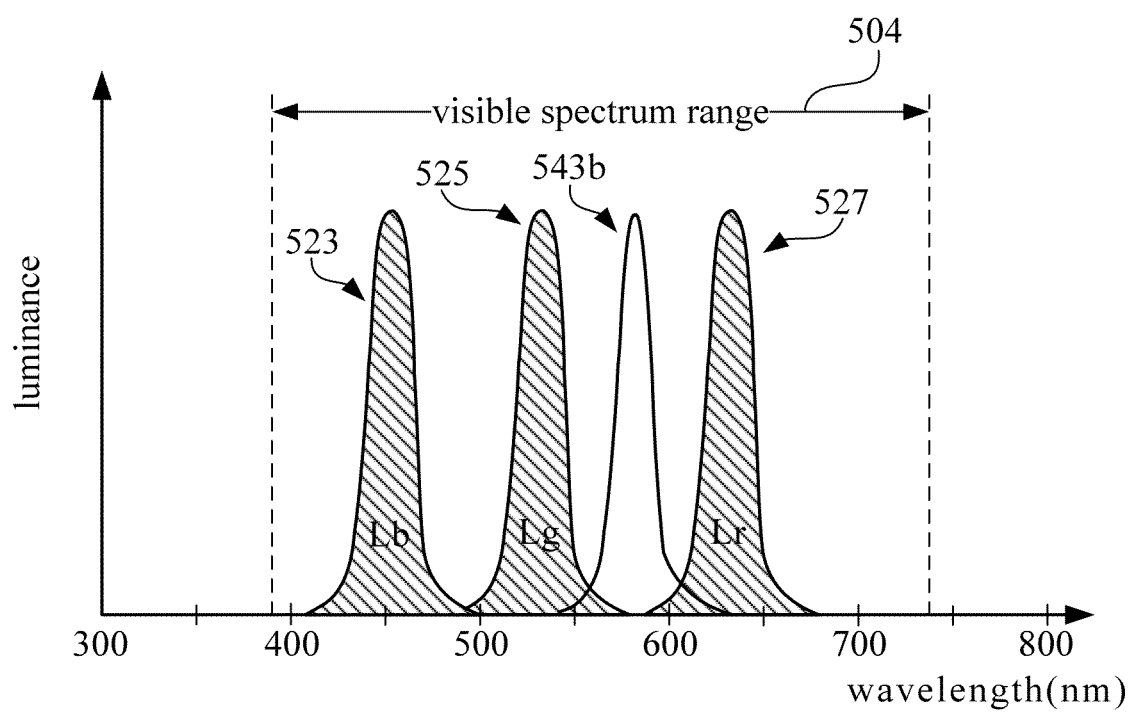
FIG. 10 is a schematic diagram illustrating a reflective band of the blue phase liquid crystal layer according to another embodiment of the invention.

However, the reflective band of the blue phase liquid crystal layer 542 is not limited to the one between the blue primary band 523 and the green primary band 525. Reference is made to FIG. 10, which is a schematic diagram illustrating a reflective band 543b of the blue phase liquid crystal layer 542 according to another embodiment of the invention. In the embodiment, shown in FIG. 10, the reflective band 543b is located between the green primary band 525 and the red primary band 527, and the light leakage in the dark state can be prevented as well. In addition, the blue phase LCD device 500 with the reflective band 543b may also maintain a high contrast ratio. Other components in this embodiment can be referred to explanations of FIG. 8 and FIG. 9. In this embodiment, the green primary color light Lg and the red primary color light Lr are the first and the second primary color lights, and the blue primary color light Lb is the third primary color light.

In the embodiment of FIG. 10, the reflective band 543b of the blue phase liquid crystal layer 542 is corresponding to a doping concentration of the chiral dopants. In the embodiment, the reflective band 543b of the blue phase liquid crystal layer 542 can be adjusted to be located between the green primary color band 525 and the red primary color band 527 by adjusting the doping concentration of the chiral dopants. In a practical example, the doping concentration of the chiral dopants can be from 3% to 10% in weight percentage of the blue phase liquid crystal layer 542 for forming the reflective band 543b in FIG. 9 of the embodiment, in which a peak length of the reflective band 543b is about 580 nanometers.

The aforementioned reflective bands 543a and 543b are not limited to the aforementioned wavelength ranges. The reflective band in the invention can be adjusted within the visible light range and not overlapped with the primary color lights generated by the backlight module. Appropriate wavelength of the reflective band can be determined by the combination of light sources in the backlight module.

An experimental example is shown below for demonstrating the relationship between an embodiment of the blue phase LCD device of the invention and a comparison model. In the embodiment of the invention, the doping concentration of the chiral dopants (such as a product numbered ZL14572 made by CHISSO Company) is about 3% to 10% in weight percentage. In the comparison model, the doping concentration of the chiral dopants (such as a product numbered ZL14572 made by CHISSO Company) is about 12% to 20% in weight percentage. In order to achieve fairness in comparison, both of the blue phase liquid crystal layers in the embodiment and the comparison model adopt the combination of the blue phase liquid crystal molecules (such as products numbered JC-1041XX or 5CB made by CHISSO Company) at 30% to 50% in weight percentage and the stabilized monomers (such as products numbered RM257 or TMPTA made by CHISSO Company) at 5% to 10% in weight percentage.

Figure 11:
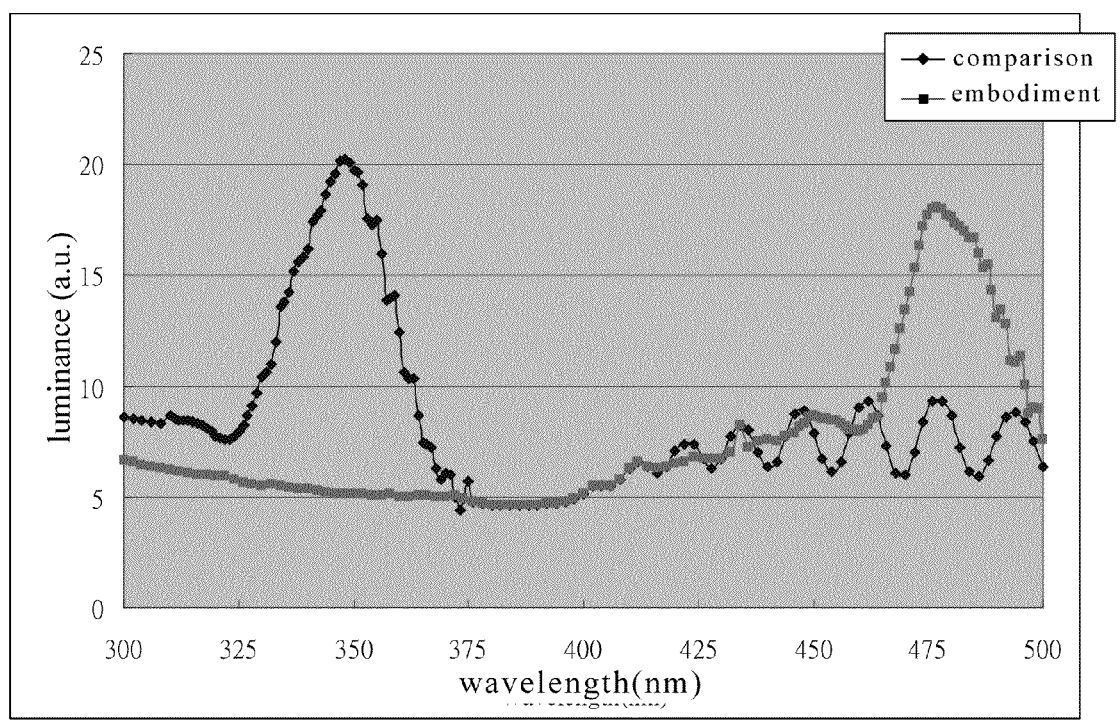
FIG. 11 is a schematic diagram illustrating a relationship of the reflective luminance and the wavelengths between the blue phase LCD devices of the comparison model and the embodiment of the invention.
Figure 12:
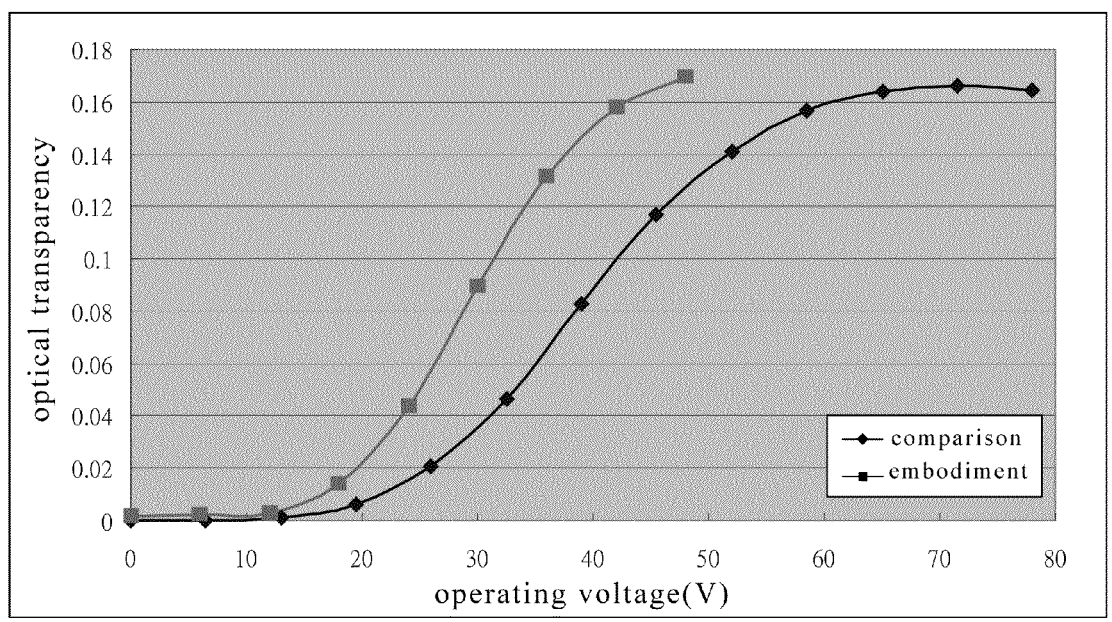
FIG. 12 is a schematic diagram illustrating a relationship of the optical transparencies and the operating voltages between the blue phase LCD devices of the comparison model and the embodiment of the invention.

Reference is made to FIG. 11 and FIG. 12. FIG. 11 is a schematic diagram illustrating a relationship of the reflective luminance and the wavelengths between the blue phase LCD devices of the comparison model and the embodiment of the invention. FIG. 12 is a schematic diagram illustrating a relationship of the optical transparencies and the operating voltages between the blue phase LCD devices of the comparison model and the embodiment of the invention.

As shown in FIG. 11 and FIG. 12, the doping concentration of the chiral dopants in the comparison model is relatively higher. The peak wavelength of the reflective band in the comparison model is about 350 nanometers outside the visible light range. However, the comparison model requires a larger operating voltage to vary the optical transperency. The comparison model requires about 53 volts for adjusting the optical transperency to 0.14.

The doping concentration of the chiral dopants in the embodiment of the invention is relative lower. The peak wavelength of the reflective band in the comparison model is from about 472 nanometers to about 478 nanometers. The embodiment needs only 37 volts for adjusting the optical transperency to 0.14. Furthermore, wavelight bands of two light sources within the backlight module of the embodiment are designed not to be overlapped with the reflective band, thereby preventing the optical leakage under dark state and elevating the contrast ratio.

As mentioned in above paragraphs, the disclosure provides a blue phase liquid crystal display device. In an embodiment, the blue phase liquid crystal layer can utilize chiral dopants of low concentration to reduce the operating voltage of the blue phase liquid crystal panel. In this case, the reflective band of the blue phase liquid crystal layer may fall in the visible light range. In the meantime, the backlight module of the blue phase liquid crystal display device utilizes multiple light sources to generate multiple lights with different primary colors respectively having different primary color bands, instead of utilizing a backlight having a full-visible light band (e.g., white light). In addition, the reflective band of the blue phase liquid crystal layer is adjusted to the one between two of the primary color bands. Therefore, the blue phase liquid crystal display device may be operated under low operating voltages and remain high contrast ratios without the light leakage problem.

As is understood by a person skilled in the art, the foregoing embodiments of the present invention are illustrative of the present invention rather than limiting of the present invention. It is intended to cover various modifications and similar arrangements included within the spirit and scope of the appended claims, the scope of which should be accorded with the broadest interpretation so as to encompass all such modifications and similar structures.

What is claimed is:

1. A blue phase liquid crystal display device, comprising:
a backlight module comprising a first light source, a second light source, and a third light source, the first light source, the second light source, and the third light source respectively generating a blue light, a green light, and a red light within a visible light range, the blue light having a first primary color band, the green light having a second primary color band, and the red light having a third primary color band; and
a blue phase liquid crystal display panel comprising a blue phase liquid crystal layer, the blue phase liquid crystal layer comprising a plurality of blue phase liquid crystal molecules and a plurality of chiral dopants, the blue phase liquid crystal layer having a reflective band between the first primary color band of the blue light and the second primary color band of the green light;
wherein a range of full width at half-maximum of the reflective band is located between and not overlapped with ranges of full width at half-maximum of the first primary color band of the blue light and the second primary color band of the green light.

2. The blue phase liquid crystal display device as claimed in claim 1, wherein each of the first light source and the second light source comprises a light-emitting diode or an organic light-emitting diode.

3. The blue phase liquid crystal display device as claimed in claim 1, wherein the blue phase liquid crystal layer comprises a polymer-stabilized blue phase liquid crystal layer.

4. The blue phase liquid crystal display device as claimed in claim 3, wherein the polymer-stabilized blue phase liquid crystal layer further comprises a stabilization polymer.

5. The blue phase liquid crystal display device as claimed in claim 1, wherein the blue phase liquid crystal molecules comprise positive blue phase liquid crystal molecules.

6. The blue phase liquid crystal display device as claimed in claim 5, wherein the blue phase liquid crystal display panel further comprises an in-plane switching display unit array for controlling the positive blue phase liquid crystal molecules.

7. The blue phase liquid crystal display device as claimed in claim 1, wherein the reflective band is located within a visible light range.

8. The blue phase liquid crystal display device as claimed in claim 1, wherein the reflective band is corresponding to a doping concentration of the chiral dopants.

9. The blue phase liquid crystal display device as claimed in claim 1, wherein a doping concentration of the chiral dopants is in a range of about 3% to 10% in weight percentage.

10. The blue phase liquid crystal display device as claimed in claim 1, wherein a peak wavelength of the reflective band is substantially located between peak wavelengths of the first primary color band of the blue light and the second primary color band of the green light.

11. The blue phase liquid crystal display device as claimed in claim 1, wherein the third light source comprises a light-emitting diode or an organic light-emitting diode.

12. The blue phase liquid crystal display device as claimed in claim 1, wherein a peak wavelength of the reflective band is substantially 475 nanometers.

13. A blue phase liquid crystal display device, comprising:
a backlight module comprising a first light source, a second light source, and a third light source, the first light source, the second light source, and the third light source respectively generating a green light, a red light, and a blue light within a visible light range, the green light having a first primary color band, the red light having a second primary color band, and the blue light having a third primary color band; and
a blue phase liquid crystal display panel comprising a blue phase liquid crystal layer, the blue phase liquid crystal layer comprising a plurality of blue phase liquid crystal molecules and a plurality of chiral dopants, the blue phase liquid crystal layer having a reflective band between the first primary color band of the green light and the second primary color band of the red light;
wherein a range of full width at half-maximum of the reflective band is located between and not overlapped with ranges of full width at half-maximum of the first primary color band of the green light and the second primary color band of the red light.

14. The blue phase liquid crystal display device as claimed in claim 13, wherein each of the first light source and the second light source comprises a light-emitting diode or an organic light-emitting diode.

15. The blue phase liquid crystal display device as claimed in claim 13, wherein the blue phase liquid crystal layer comprises a polymer-stabilized blue phase liquid crystal layer.

16. The blue phase liquid crystal display device as claimed in claim 15, wherein the polymer-stabilized blue phase liquid crystal layer further comprises a stabilization polymer.

17. The blue phase liquid crystal display device as claimed in claim 13, wherein the blue phase liquid crystal molecules comprise positive blue phase liquid crystal molecules.

18. The blue phase liquid crystal display device as claimed in claim 17, wherein the blue phase liquid crystal display panel further comprises an in-plane switching display unit array for controlling the positive blue phase liquid crystal molecules.

19. The blue phase liquid crystal display device as claimed in claim 13, wherein the reflective band is located within a visible light range.

20. The blue phase liquid crystal display device as claimed in claim 13, wherein the reflective band is corresponding to a doping concentration of the chiral dopants.

21. The blue phase liquid crystal display device as claimed in claim 13, wherein a doping concentration of the chiral dopants is in a range of about 3% to 10% in weight percentage.

22. The blue phase liquid crystal display device as claimed in claim 13, wherein a peak wavelength of the reflective band is substantially located between peak wavelengths of the first primary color band of the green light and the second primary color band of the red light.

23. The blue phase liquid crystal display device as claimed in claim 13, wherein the third light source comprises a light-emitting diode or an organic light-emitting diode.

24. The blue phase liquid crystal display device as claimed in claim 13, wherein a peak wavelength of the reflective band is substantially 580 nanometers.

25. A blue phase liquid crystal display device, comprising:
a backlight module comprising a first light source, a second light source, and a third light source, the first light source, the second light source, and the third light source respectively generating a first primary color light, a second primary color light, and a third primary color light within a visible light range, the first primary color light having a first primary color band, the second primary color light having a second primary color band, and the third primary color light having a third primary color band, wherein a peak wavelength of the first primary color band is smaller than a peak wavelength of the second primary color band, and a peak wavelength of the second primary color band is smaller than a peak wavelength of the third primary color band; and
a blue phase liquid crystal display panel comprising a blue phase liquid crystal layer, the blue phase liquid crystal layer comprising a plurality of blue phase liquid crystal molecules and a plurality of chiral dopants, the blue phase liquid crystal layer having a reflective band between the first primary color band and the second primary color band;
wherein a range of full width at half-maximum of the reflective band is located between and not overlapped with ranges of full width at half-maximum of the first primary color band and the second primary color band.

26. A blue phase liquid crystal display device, comprising:
a backlight module comprising a first light source, a second light source, and a third light source, the first light source, the second light source, and the third light source respectively generating a first primary color light, a second primary color light, and a third primary color light within a visible light range, the first primary color light having a first primary color band, the second primary color light having a second primary color band, and the third primary color light having a third primary color band, wherein a peak wavelength of the first primary color band is larger than a peak wavelength of the second primary color band, and a peak wavelength of the second primary color band is larger than a peak wavelength of the third primary color band; and
a blue phase liquid crystal display panel comprising a blue phase liquid crystal layer, the blue phase liquid crystal layer comprising a plurality of blue phase liquid crystal molecules and a plurality of chiral dopants, the blue phase liquid crystal layer having a reflective band between the first primary color band and the second primary color band;
wherein a range of full width at half-maximum of the reflective band is located between and not overlapped with ranges of full width at half-maximum of the first primary color band and the second primary color band.

* * * * *